United States Patent
Gutierrez et al.

(10) Patent No.: US 9,709,995 B2
(45) Date of Patent: Jul. 18, 2017

(54) CHEMICAL INJECTION SYSTEM

(71) Applicant: Dresser, Inc., Addison, TX (US)

(72) Inventors: Francisco M. Gutierrez, Houston, TX (US); Richard D. Atton, Houston, TX (US)

(73) Assignee: Dresser, Inc., Addison, TX (US)

( * ) Notice: Subject to any disclaimer, the term of this patent is extended or adjusted under 35 U.S.C. 154(b) by 16 days.

(21) Appl. No.: 14/579,141

(22) Filed: Dec. 22, 2014

(65) Prior Publication Data

US 2015/0105909 A1    Apr. 16, 2015

Related U.S. Application Data

(63) Continuation of application No. 12/794,898, filed on Jun. 7, 2010, now abandoned.

(60) Provisional application No. 61/184,890, filed on Jun. 8, 2009.

(51) Int. Cl.
| | | |
|---|---|---|
| *G05D 11/13* | (2006.01) | |
| *G05B 15/02* | (2006.01) | |
| *E21B 33/068* | (2006.01) | |
| *G05D 7/06* | (2006.01) | |

(52) U.S. Cl.
CPC ............ *G05D 11/13* (2013.01); *E21B 33/068* (2013.01); *G05B 15/02* (2013.01); *G05D 7/0617* (2013.01); *G05D 11/132* (2013.01)

(58) Field of Classification Search
CPC ..... F17D 3/01; F17D 3/12; F17D 3/18; F17D 3/145; G05D 11/138; G05D 11/132; G05D 15/02
See application file for complete search history.

(56) References Cited

U.S. PATENT DOCUMENTS

| | | |
|---|---|---|
| 4,196,169 A | 4/1980 | Gablin et al. |
| 5,104,621 A | 4/1992 | Pfost |
| 5,108,703 A | 4/1992 | Pfost |
| 5,125,748 A | 6/1992 | Bjornson et al. |
| 5,139,744 A | 8/1992 | Kowalski |
| 5,333,675 A | 8/1994 | Mullis |
| 5,411,065 A | 5/1995 | Meador |

(Continued)

OTHER PUBLICATIONS

Inaudi, Daniele; Long-Range Pipeline Monitoring by Distributed Fiber Optic Sensing Feb. 2010.*

(Continued)

*Primary Examiner* — Brian R Gordon
(74) *Attorney, Agent, or Firm* — Paul Frank + Collins P.C.

(57) ABSTRACT

A chemical injection system includes a pump in fluid communication with a chemical reservoir and a pipeline; a motor coupled to the pump and adapted to drive the pump to transfer a chemical fluid from the reservoir to the pipeline; a motor controller electrically coupled to a power module and the motor and adapted to adjust a rotational speed of the motor; and a central controller communicably coupled to the motor controller and a remote computing device. The controller includes a translator adapted to receive a signal from the remote computing device in a first communication protocol and translate the signal from the remote computing device to a command in a second communication protocol distinct from the first communication protocol, where the command is operable to adjust the motor controller to adjust the rotational speed of the motor.

8 Claims, 5 Drawing Sheets

(56) References Cited

U.S. PATENT DOCUMENTS

| | | | |
|---|---|---|---|
| 5,428,470 A | 6/1995 | Labriola | |
| 5,656,493 A | 8/1997 | Mullis | |
| 5,772,963 A | 6/1998 | Cantatore | |
| 5,908,599 A | 6/1999 | Behringer | |
| 5,961,923 A | 10/1999 | Nova | |
| 6,063,339 A | 5/2000 | Tisone et al. | |
| 6,093,574 A | 7/2000 | Druyor-Sanchez | |
| 6,416,713 B1 | 7/2002 | Ford | |
| 6,644,848 B1 | 11/2003 | Clayton et al. | |
| 6,851,444 B1 | 2/2005 | Kohl et al. | |
| 7,234,524 B2 | 6/2007 | Shaw et al. | |
| 7,378,058 B2 | 5/2008 | Lemme | |
| 7,389,787 B2 | 6/2008 | Means et al. | |
| 7,526,944 B2 * | 5/2009 | Sabata | G01N 17/00 702/113 |
| 7,711,486 B2 | 5/2010 | Thigpen et al. | |
| 7,815,871 B2 | 10/2010 | Pamula | |
| 7,878,250 B2 | 2/2011 | Sheldon | |
| 7,939,017 B2 | 5/2011 | Uffenheimer | |
| 7,939,021 B2 | 5/2011 | Smith | |
| 7,939,584 B2 | 5/2011 | Harris et al. | |
| 8,012,768 B2 | 9/2011 | Jafari | |
| 8,066,946 B2 | 11/2011 | Redmond | |
| 8,076,928 B2 * | 12/2011 | Nunally | F17D 5/00 324/220 |
| 8,147,773 B2 | 4/2012 | Lemme | |
| 2009/0095351 A1 | 4/2009 | Greening et al. | |
| 2010/0304018 A1 | 12/2010 | Achour et al. | |

OTHER PUBLICATIONS

Oil and Gas Online; Pipeline Moniotring System, http:www.oilandgasonline.com/doc/pipeline-monitoring-system-0001; 1996-2016.*

Jawhar, Imad; A Routing Protocol and Addressing Scheme for Oi, Gas, and Water Pipeline Monitoring Using Wireless Sensor Networks; 2008.*

* cited by examiner

CHEMICAL INJECTION SYSTEM

CROSS-REFERENCE TO RELATED APPLICATIONS

This application is a continuation of U.S. patent application Ser. No. 12/794,898, filed on Jun. 7, 2010, and entitled "CHEMICAL INJECTION SYSTEM," which claims the benefit of priority to U.S. Provisional Application Ser. No. 61/184,890, filed on Jun. 8, 2009.

BACKGROUND

This disclosure relates to a chemical injection system and, more particularly, to a chemical injection system controlled through remote communications via one or more communication protocols.

Conduit systems that carry and/or transport one or more fluids may utilize injection systems to insert other fluids (e.g., additives, inhibitors, or otherwise) into the conduit system. For example, hydrocarbon systems that transport hydrocarbon fluids, such as oil and/or gas or other fluids, often receive injected fluids in order to, for example, control corrosion within the conduit or pipeline; prevent paraffin deposition; and break emulsions in the transported hydrocarbon fluids. The injected fluids may also be used for water removal or separation from hydrocarbon gasses or liquids. In some instances, a chemical injector may be associated with a wellsite or other hydrocarbon production facility in order to inject chemical additives into a pipeline fluidly coupled at the wellsite with a wellbore producing hydrocarbons. The chemical injector may periodically inject a set amount of chemical additives into the pipeline at predetermined intervals in order to maintain a desired amount of such additives within the pipeline. In such instances, however, the chemical injector may simply inject the additives on a timer system without regard to certain variables such as, for example, the flow rate through the pipeline the amount (percentage concentration) of additives already within the transported hydrocarbon fluids in the pipeline, possible problems within the pipeline or production facility, and/or a desired or required increase in the set amount of additives injected into the pipeline. Further, the chemical injector may have no ability to communicate with other equipment and/or monitoring systems in order to take account of such variables. If communication is possible, however, equipment and/or monitoring systems communicably coupled with the chemical injector may not transmit data and/or instructions in a protocol readily understood by the chemical injector, or vice versa.

BRIEF DESCRIPTION OF THE INVENTION

In one general embodiment, a method for controlling a chemical injection system for a hydrocarbon transmission system includes providing a chemical injection system. The chemical injection system includes a pump driven by a motor and in fluid communication with a chemical reservoir and the hydrocarbon transmission system, where the pump is adapted to inject one or more chemical fluids into the hydrocarbon transmission system. The chemical injection system includes a motor controller coupled to the motor and adapted to control operation of the motor, and a controller communicably coupled to the motor controller. The method includes receiving an operational command at the chemical injection system in a first communication protocol from a remote computer; translating, at the controller, the operational command at the first communication protocol to an operational command at a second communication protocol different than the first communication protocol; transmitting the operational command at the second communication protocol from the controller to the motor controller; and adjusting the motor controller to control the operation of the motor in response to receiving the operational command at the second communication protocol from the controller.

In another general embodiment, a chemical injection system for a hydrocarbon pipeline includes: a pump in fluid communication with a chemical reservoir and the pipeline; a motor coupled to the pump and adapted to drive the pump to transfer a chemical fluid from the reservoir to the pipeline; a motor controller electrically coupled to a power module and the motor and adapted to adjust a rotational speed of the motor, and a central controller communicably coupled to the motor controller and a remote computing device. The controller includes a translator adapted to receive a signal from the remote computing device in a first communication protocol and translate the signal from the remote computing device to a command in a second communication protocol distinct from the first communication protocol, where the command is operable to adjust the motor controller to adjust the rotational speed of the motor.

In another general embodiment, a system includes: a remote computing system comprising a graphical user interface (GUI); a sensor coupled with a hydrocarbon transmission system; and a chemical injection system. The chemical injection system includes: a pump in fluid communication with a chemical reservoir and the hydrocarbon transmission system; a motor coupled to the pump and adapted to drive the pump to transfer a chemical fluid from the reservoir to the hydrocarbon transmission system; a power module adapted to receive solar power and convert the solar power to electrical power, a motor controller electrically coupled to the power module and the motor and adapted to adjust a rotational speed of the motor, and a central controller communicably coupled to the motor controller and communicably coupled to the remote computing system and the sensor. The controller includes a translator adapted to receive a signal from the remote computing system in a first communication protocol and translate the signal from the remote computing system to a command in a second communication protocol distinct from the first communication protocol, where the command operable to adjust the motor controller to adjust the rotational speed of the motor.

In one aspect of one or more general embodiments, a method may further include receiving a second operational command at the chemical injection system in a third communication protocol from the remote computer translating, at the controller, the second operational command at the third communication protocol to second operational command at the second communication protocol different than the third communication protocol; transmitting the second operational command at the second communication protocol from the controller to the motor controller, and adjusting the motor controller to control the operation of the motor in response to receiving the second operational command at the second communication protocol from the controller.

In one aspect of one or more general embodiments, a method may further include monitoring at least one parameter of the hydrocarbon transmission system by the chemical injection system; transmitting the parameter to the remote computer, and receiving a fourth operational command at one of the first or third communication protocols from the remote computer in response to the parameter.

In one aspect of one or more general embodiments, the parameter may include one of the following: a fluidic pressure in the hydrocarbon transmission system; a fluidic flowrate in the hydrocarbon transmission system; a percentage concentration by weight or volume of chemical fluid in the hydrocarbon transmission system; an operational parameter of the motor; a controller temperature; a battery voltage; a motor current; a solar cell charge current; and one or more fault conditions.

In one aspect of one or more general embodiments, a method may further include measuring the parameter with a sensor positioned in the hydrocarbon transmission system; and wirelessly transmitting a signal representative of the parameter from the sensor to the chemical injection system.

In one aspect of one or more general embodiments, chemical additives may include at least one of: a corrosion inhibitor; a paraffin inhibiter; a demulsifier, an ethanol; and a foamer.

In one aspect of one or more general embodiments, receiving an operational command at the chemical injection system in a first communication protocol from a remote computer may include receiving an operational command at the chemical injection system in a first communication protocol from a remote computer via a radio frequency RF signal.

In one aspect of one or more general embodiments, a method may further include receiving a signal representative of a sensed parameter of the hydrocarbon transmission system in the second communication protocol; translating the parameter in the second communication protocol to a signal representative of the sensed parameter in the first communication protocol; and transmitting the signal representative of the sensed parameter in the first communication protocol to the remote computer.

In one aspect of one or more general embodiments, adjusting the motor controller to control the operation of the motor in response to receiving the operational command at the second communication protocol from the controller may include adjusting a rotational speed of the motor.

In one aspect of one or more general embodiments, a method may further include providing a sensor coupled to the hydrocarbon transmission system and adapted to monitor an operational parameter of the system; receiving a signal representative of the operational parameter at the controller from the sensor; and automatically adjusting the motor controller to adjust a rotational speed of the motor in response to receiving the signal representative of the operational parameter.

In one aspect of one or more general embodiments, a method may further include providing a second chemical injection system; receiving a third operational command at the second chemical injection system in the first communication protocol from the remote computer, translating, at the second controller, the third operational command at the first communication protocol to a third operational command at the second communication; transmitting the third operational command at the second communication protocol from the second controller to the second motor controller, and adjusting the second motor controller to control the operation of the second motor in response to receiving the third operational command at the second communication protocol from the second controller. The second chemical injection system may include: a second pump driven by a second motor and in fluid communication with the chemical reservoir and the hydrocarbon transmission system, where the second pump is adapted to inject one or more chemical fluids into the hydrocarbon transmission system; a second motor controller coupled to the second motor and adapted to control operation of the second motor, and a second controller communicably coupled to the second motor controller.

In one aspect of one or more general embodiments, the motor controller may include a variable frequency drive.

In one aspect of one or more general embodiments, the translator may be further adapted to receive a signal from the remote computing device in a third communication protocol and translate the signal from the remote computing device to a second command in the second communication protocol distinct from the third and the first communication protocols, where the second command is operable to adjust the motor controller to adjust the rotational speed of the motor.

In one aspect of one or more general embodiments, a system may further include a receiver communicably coupled to the central controller and adapted to receive the signal from the remote computing device, the signal comprising a radio frequency (RF) signal.

In one aspect of one or more general embodiments, the receiver may be adapted to receive a second signal from a remote sensor coupled to the pipeline.

In one aspect of one or more general embodiments, the controller may be further adapted to receive the second signal from the remote sensor through the receiver and transmit the second signal to the remote computing device.

In one aspect of one or more general embodiments, the translator may be adapted to receive the second signal from the receiver, the second signal in the second communication protocol, and translate the second signal to a third signal in the first communication protocol.

In one aspect of one or more general embodiments, the second communication protocol may include a Modbus protocol.

In one aspect of one or more general embodiments, the GUI may be adapted to display one or more operational parameters of the chemical injection system.

In one aspect of one or more general embodiments, a system may further include a transceiver communicably coupled to the remote computing station through a communications network, the transceiver in RF communication with the chemical injection system.

In one aspect of one or more general embodiments, a system may further include one or more communication stations in RF communication with the chemical injection system and the transceiver, where each communication station is adapted to relay operational parameters of the chemical injection system in the form of RF signals between the transceiver and the chemical injection system.

In one aspect of one or more general embodiments, a system may further include: a second sensor coupled with the hydrocarbon transmission system; and a second chemical injection system. The second chemical injection system may include a pump in fluid communication with the chemical reservoir and the hydrocarbon transmission system: a motor coupled to the pump and adapted to drive the pump to transfer the chemical fluid from the reservoir to the hydrocarbon transmission system: a power module; a motor controller electrically coupled to the power module and the second motor and adapted to adjust a rotational speed of the motor; and a central controller communicably coupled to the motor controller and to the remote computing system and the second sensor. The controller may include a translator adapted to receive a signal from the remote computing system in the first communication protocol and translate the signal from the remote computing system to a command in the second communication protocol distinct from the first communication protocol, where the command is operable to adjust the motor controller to adjust the rotational speed of the motor.

One or more of the above-described embodiments, as well as other embodiments described herein, may include one or more of the following features. For example, a chemical injection system may be remotely controlled through wired or wireless communication. A chemical injection system may be able to receive data in the form of a particular communication protocol and translate such data into a separate and distinct protocol. A chemical injection system may be able to reduce waste of chemicals injected into a hydrocarbon pipeline upon loss of pipeline pressure due to breaks or leaks. A chemical injection system may include a stand-alone power generation module obviating the need for electrical power from a municipal, city, or state power grid. A hydrocarbon transmission system including one or more chemical injection systems may more efficiently inject chemical additives into the system by monitoring the amount of additives present in the system, thereby preventing waste. Further, a hydrocarbon transmission system including one or more chemical injection systems may account for relative distances between production sites and pipeline monitoring locations in order to efficiently inject chemical additives into the system without waste. Additionally, a hydrocarbon transmission system including one or more chemical injection systems may monitor the amounts of injected chemical remaining in one or more chemical fluid reservoirs in order to avoid such injection units running out of chemicals.

These general and specific aspects may be implemented using a device, system or method, or any combinations of devices, systems, or methods. The details of one or more embodiments are set forth in the accompanying drawings and the description below. Other features, objects, and advantages will be apparent from the description and drawings, and from the claims.

DETAILED DESCRIPTION

In one embodiment, a chemical injection system for a hydrocarbon transmission system includes a pumping system adapted to inject a specified amount of chemical additive into the transmission system; and a controller communicably coupled to the pumping system and adapted to receive one or more operational parameters of the transmission system and transmit a command to the pumping system based on the one or more operational parameters, where the pumping system injects the specified amount in response to the command.

In another embodiment, a chemical injection system for a hydrocarbon transmission system includes a pumping system adapted to inject a specified amount of chemical additive into the transmission system; and a controller communicably coupled to the pumping system and adapted to receive one or more operational parameters of the transmission system in a first communication protocol and transmit a command to the pumping system based on the one or more operational parameters, where the pumping system injects the specified amount in response to the command. The command is in a second communication protocol distinct from the first protocol.

In another embodiment, a chemical injection system for a hydrocarbon transmission system includes a pumping system adapted to inject a specified amount of chemical additive into the transmission system; and a controller communicably coupled to the pumping system and a remote data source. The controller is adapted to receive one or more operational parameters of the transmission system from the remote data source and transmit a command to the pumping system based on the one or more operational parameters, where the pumping system injects the specified amount in response to the command.

In another embodiment, a hydrocarbon transmission system includes a pipeline adapted to enclose a fluid transmitted from a plurality of hydrocarbon production sites to a processing site and a plurality of chemical injection systems. Each injection system includes a pumping system adapted to inject a specified amount of chemical additive into the pipeline; and a controller communicably coupled to the pumping system and adapted to receive one or more operational parameters of the pipeline and transmit a command to the pumping system based on the one or more operational parameters, where the pumping system injects the specified amount in response to the command. The hydrocarbon transmission system further includes a data capture apparatus remote from the plurality of chemical injection systems and coupled to the pipeline, the data capture apparatus adapted to detect the one or more operational parameters and transmit the parameters to at least one of the plurality of chemical injection systems, where the one or more operational parameters include a distance between the data capture apparatus and the plurality of chemical injection systems.

Figure 1:
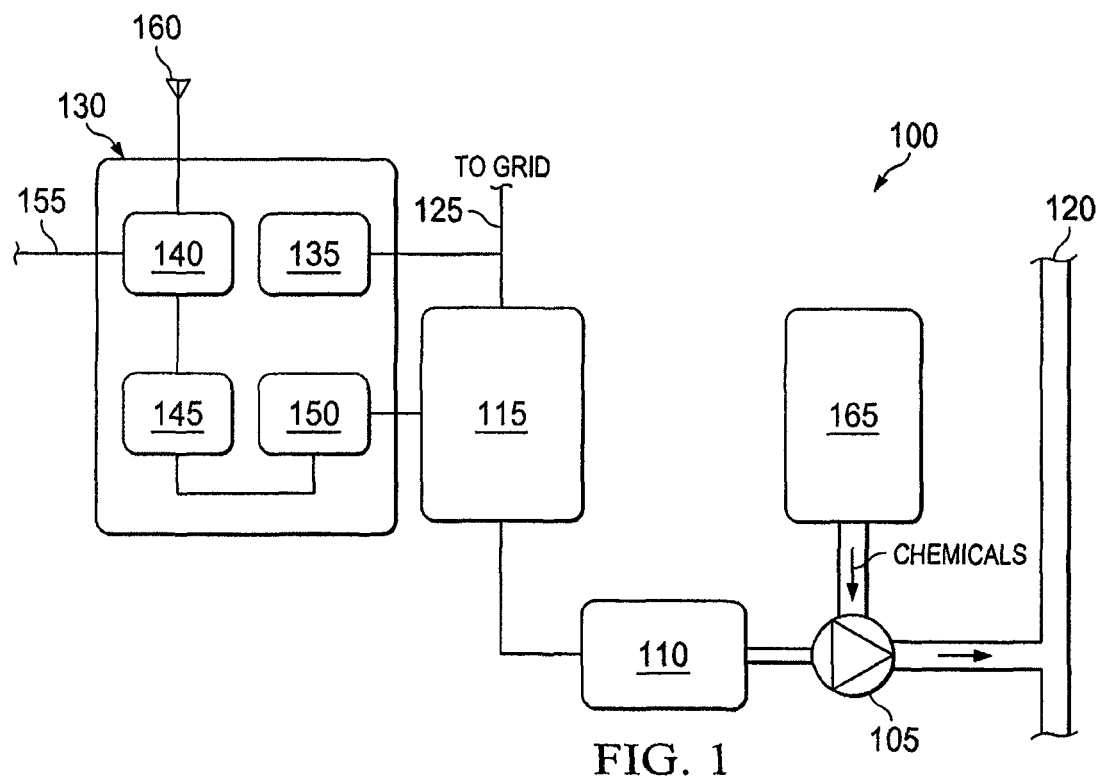
FIG. 1 illustrates a block diagram of one embodiment of a chemical injection system in accordance with the present disclosure.

FIG. 1 illustrates a block diagram of one embodiment of a chemical injection system 100 in accordance with the present disclosure. Chemical injection system 100, typically, includes a pump 105 mechanically coupled to a driver, such as a motor 110; a motor controller 115; a controller 130, and a chemical reservoir 165. In some embodiments, the controller 130 may be a single unit integrating a motor-controller, controller, and a data acquisition module. Alternatively, at least one of the data acquisition module (not shown) and motor-controller may be separate from the controller 130. In one preferred embodiment, the chemical injection system 100 may be utilized in a hydrocarbon production system, such as, for example, a field or area having one or more hydrocarbon (e.g., oil, natural gas) production sites. Chemical injection system 100 may be used in such embodiments to inject or otherwise introduce chemicals (e.g., corrosion inhibitors, ethanol, foamer, paraffin inhibiter, demulsifier, or other chemical) into a hydrocarbon conduit, such as a pipeline 120 or wellbore. In some embodiments, for example, an appropriate amount of chemicals, such as a predetermined volumetric amount, an amount per unit volume of fluid flowing through a pipeline, or an amount sufficient to keep a measured pipeline parameter within in a particular range, may be injected into the pipeline 120 or other hydrocarbon transmission apparatus.

Pump 105 is fluidly coupled to the pipeline 120 and the reservoir 165 and, generally, draws a specified amount of chemical stored in the reservoir 165 and injects the chemical into the pipeline 120 at predefined time intervals, predetermined operating conditions, and/or when commanded. Pump 105 may be any appropriate fluid displacement device, such as, for example, a centrifugal pump, diaphragm pump, or other rotary fluid displacement apparatus, or a positive displacement (e.g., piston or plunger) pump, such as a reciprocating pump. In any event, reference to the pump 105 includes all fluid displacement apparatus operable to receive a fluid at an inlet and impart mechanical energy to the fluid for transporting the fluid through an outlet. In the illustrated embodiment, pump 105 receives chemicals from the reservoir 165 and introduces the chemical into the pipeline 120; alternatively, chemicals may be received at the pump 105 through a separate pipeline or conduit, as appropriate.

In some embodiments, pump 105 may be constructed with particular materials in order to prevent corrosion or deterioration due to the flow of chemical fluid through the pump 105. For instance, one or more components of pump 105 may be constructed of stainless steel (e.g., 316), titanium, or any other non-corrosive material, as appropriate.

Motor 110 is mechanically coupled to the pump 105 and provides power to the pump 105 for fluid displacement. In some embodiments, the motor 110 includes a weatherproof enclosure or design, and is adapted to function in environmentally extreme (e.g., snow, rain, heat) and hazardous conditions. For example, motor 110 may be a totally-enclosed fan cooled (TEFC), totally-enclosed air over (TEAO), hazardous duty, and/or explosion proof motor. In any event, motor 110 may include the appropriate NEMA (National Electrical Manufacturers Association) rating for operating requirements in an outdoor, hydrocarbon production area.

Motor controller 115 is electrically coupled to the motor 110 and, typically, controls the supply of phased power (e.g., 120/3/60, 460/3/60, 208/3/60, 240/1/60, 50 Hertz, DC: 12/24/48/96/single or three phase/brushed or brushless) to the motor 110. Motor controller 115 receives electrical power, in some embodiments, from an area power supply, such as a municipal or state power grid, through the power supply 125. Alternatively, or in addition, the motor controller 115 may receive electrical power through the power supply from a power module 135, which may be enclosed in, integral with, or separate from the controller 130. For instance, in some embodiments, the power module 135 may be a solar power module, operable to convert solar energy to electrical power. Other forms of power generation (e.g., wind, natural gas, hydroelectric, etc.) may also be used, as appropriate. Power module 135 may also be a battery, such as a lithium, zinc-carbon, gel cell, full cell, or alkaline cell battery, as appropriate. In one preferred embodiment, the power module 135 may be the primary source of electrical power to the motor controller 115 (and thus motor 110), with the power grid as a secondary power source should there be problems or a failure of the power module 135. Alternatively, in some embodiments, the power grid may be the primary source of electrical power to the motor controller 115 with the power module 135 serving as the secondary source of electrical power. Further, in some embodiments, the power module 135 could be a combined solar module and battery.

Motor controller 115 is electrically coupled to the motor 110 and, typically, provides and controls electrical power to the motor 110 for operation of the pump 105. In some embodiments, motor controller 110 may be a combination starter/disconnect, which provides "on-off" control of electrical power to the motor 110. In such embodiments, the motor 110 may be operated as a constant (or single) speed motor. Alternatively, the motor controller 115 may also be a variable frequency controller, operable to provide electrical power to motor 110 at a variety of frequencies (and thus rotational motor speeds) as system operating conditions warrant. As with the motor 110, motor controller 115 may be enclosed or otherwise protected against environmental and/or hazardous operating conditions.

Controller 130 is communicably coupled to the motor controller 115 and, typically, provides microprocessor-based control of the motor controller 115 and thus motor 110 and pump 105. The controller 130 includes a communication module 140, a translation module 145, motor driver, data acquisition, data storage, and a processor 150. As illustrated in FIG. 1, these components may be enclosed or integrated with controller 130. Alternatively, one or more of the communication module 140, translation module 145, processor 150, and also the power module 135 may be in separate enclosures but communicably coupled in between. Generally, controller 130 receives inputs and/or instructions and commands from a remote source and, according to the commands, controls the operation and/or speed of the motor 110 and pump 105 to inject chemicals into the pipeline 120. Alternatively, the controller 130 may be a stand alone controller with preset programs and schedules to execute. For example, the controller 130 may receive data representative of pipeline conditions, such as line pressure, amount of chemicals present in the pipeline 120, and motor operating conditions, and in turn, control the pump 105 to inject more or less chemicals into the pipeline 120.

The controller 130, in some preferred embodiments, may include a combination of software, middleware, and hardware configured as the communication module 140, translation module 145, and processor 150. Controller 130 may further include one or more memory devices (not shown) located therein or communicably coupled to the controller 130. In some embodiments, for example, such memory may be any database module and may take the form of volatile or non-volatile memory including, without limitation, magnetic media, optical media, random access memory (RAM), read-only memory (ROM), removable media, or any other suitable local or remote memory component. The memory may also include any other appropriate data such as data classes or object interfaces, and software sub-applications or sub-systems.

In certain embodiments, for example, the controller 130 may store in memory and execute one or more software applications written or described in any appropriate computer language including C, C-++, Java, Visual Basic, assembler, Perl, any suitable version of 4GL, as well as others. Such applications may be executed by the processor 150 located within or communicably coupled to the controller 130. Processor 150 executes instructions and manipulates data to perform the operations of the controller 130. The processor 150 may be, for example, a central processing unit (CPU), a blade, an application specific integrated circuit (ASIC), or a field-programmable gate array (FPGA). Although the present disclosure contemplates a single processor 150 in controller 130, multiple processors may be used according to particular needs, and reference to a single processor 150 is meant to include multiple processors where applicable.

In some embodiments, the controller 130 is communicably coupled to a communication bus 155 at the communication module 140. The communication bus 140, generally, is a wired communication connection operable to carry data between the communication module and a remote source, such as one or more electronic sensors monitoring the pipeline 120, the motor 110, the pump 105, or other component or apparatus. In any event, communication bus 155 is a non-limiting example of wired communications between the system 100 and a remote data source.

Alternatively or in addition to the communication bus 155, system 100 may include a wireless antenna 160 operable to facilitate electronic communication between the controller 130 and a remote source. Wireless antenna 160 may communicate through any appropriate wireless technique, such as, for example, radio frequency (RF), WiFi, microwave, and any appropriate IEEE standard technique. In one embodiment, for example, wireless sensors may detect various operational parameters of the pipeline 120, such as line pressure and/or chemical concentrate, and transmit such data to the controller 130 via the wireless antenna 160.

The communication module 140 receives and/or transmits data between a remote source via one or both of the communication bus 155 and wireless antenna 160. In some embodiments, only one of the bus 155 and antenna 160 is utilized in the system 100. For example, the communication module 140 may be a wireless modem operable to receive and transmit electronic data and signals from and to the remote source through the wireless antenna 160.

Translation module 145 is communicably coupled to the communication module 140 and the processor 150. Typically, translation module 145 receives data communicated in a particular communication protocol to the system 100 via the communication bus 155 and/or wireless antenna 160 and, when necessary, translates such data to a secondary communication protocol understood by the motor controller 115 or other components of the system 100. For instance, data may be sent to the controller 130 in many different protocols, such as RS-232, RS-485 (Modbus or EIA-485), RS-422 (or EIA-422), TCP/IP, Fieldbus, DeviceNet, and Profibus, to name but a few. The motor controller 115 may be configured to receive data in only one, or just a few, protocols (e.g., a version of the Modbus serial communication protocol, such as Modbus RTU, Modbus ASCII, Modbus TCP/IP, Modbus TCP, Modbus over TCP/IP, Modbus over TCP, and/or Modbus Plus). Thus, the translation module 145 allows a remote source of data to be transmitted to the control 130 in a remote protocol without regard to the particular protocol understood by the motor controller 115.

Further, in some embodiments, the translation module 145 may allow a user or operator to connect to the controller 130 and receive feedback data (e.g., operational data of the motor 110, pump 105, or any other component of the system 100) without regard to a particular protocol understood by the user's device (i.e., computer, laptop, PDA, cell phone). In other words, the translation module 145 may perform two-way protocol translation between the system 100 and the user or operator. In such fashion, the user or operator may seamlessly communicate with the system 100 without any additional action required on the user's part.

Processor 150 performs any logical operation necessary for controlling, operating, or otherwise managing the system 100, and in particular, the motor controller 115 and thus motor 110 and pump 105. For instance, the processor 150 may receive one or more data signals representative of, for example, pipeline fluid line pressure, pipeline fluid flowrate, pipeline chemical percentage concentrate by volume or by weight, motor operating parameter (e.g., amp draw, voltage, winding temperature) and transmit commands to the motor controller 115 based on such data. As one specific example, a wireless pressure sensor may be installed at a particular location in the pipeline 120. The sensor may periodically transmit the sensed line pressure to the controller 130 via the wireless antenna 160. When such sensed pressure falls below a minimum threshold, such as when a pipeline break occurs, the processor 150 may command the motor controller 115 to stop or reduce the speed of the motor 110 and pump 105 so that additional chemicals are not injected into the pipeline 120 and wasted.

Figure 2:
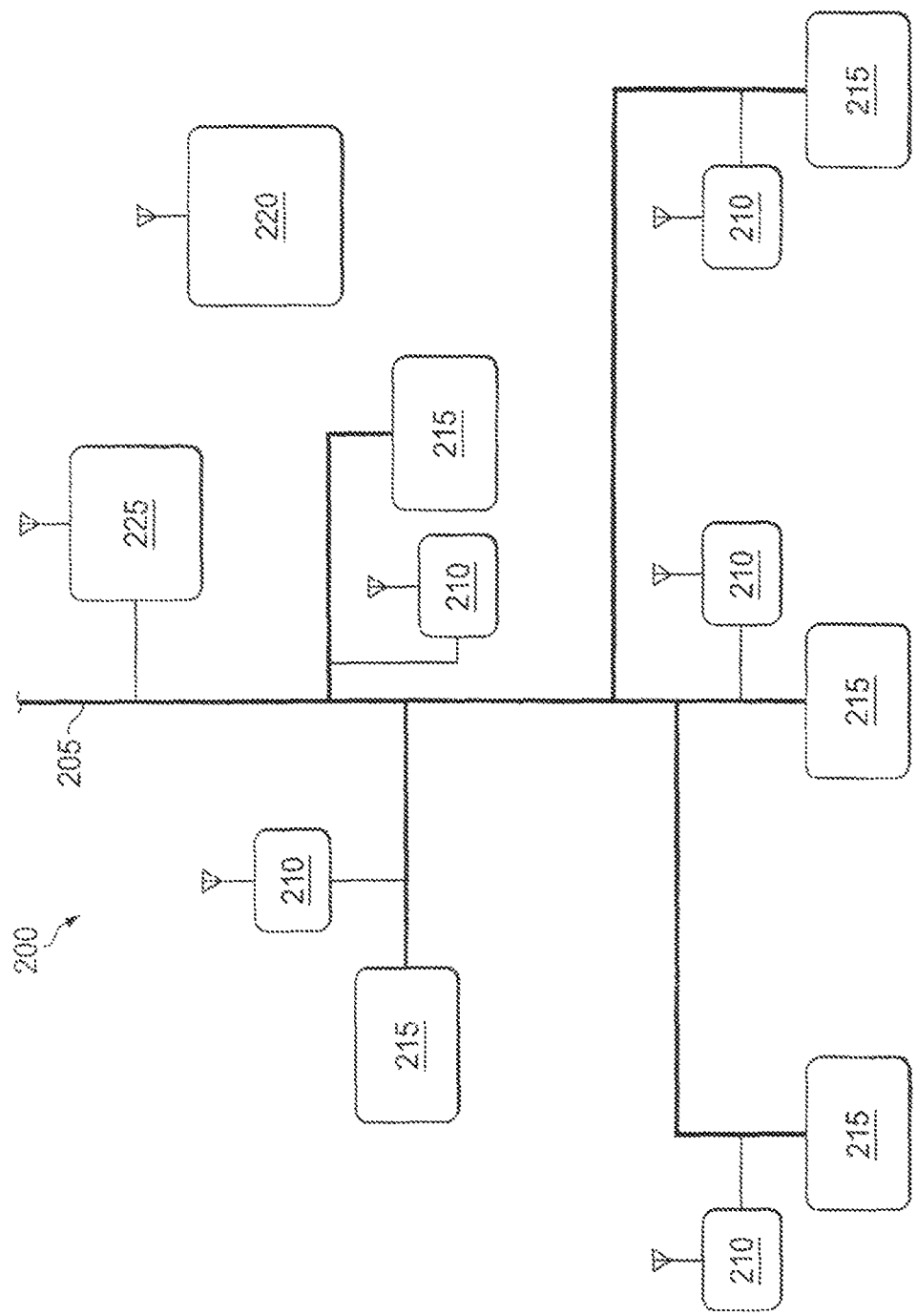
FIG. 2 illustrates a block diagram of a hydrocarbon production system utilizing one or more chemical injection systems in accordance with the present disclosure.

FIG. 2 illustrates a block diagram of a hydrocarbon production system 200 utilizing one or more chemical injection systems 210 in accordance with the present disclosure. In some embodiments, for instance, the one or more chemical injection systems 210 may be substantially similar to chemical injection system 100. System 200 includes one or more hydrocarbon production sites 215, each of which is fluidly coupled to a pipeline 205. At one or more of the sites 215, a chemical injection system 210 is also in fluid communication with the pipeline 205 and operates in accordance with the chemical injection system 100 described above. At a main (or side) branch of the pipeline 205, a monitoring module 225 detects one or more operational parameters of the hydrocarbon stream within the pipeline 205. The system 200 also includes a remote control center 220. As illustrated in FIG. 2, the chemical injection systems 210, monitoring module 225, and remote control center 220 may all be in wireless communication. Further, although a particular number of sites 215, injection systems 210, monitoring module 225, and control center 220 are shown, more or less of each component, as appropriate, may be utilized in keeping with the present disclosure.

In some embodiments, the production system 200 may operate as follows. Monitoring module 225 may include a number of wireless sensor devices operable to detect one or more operational parameters of the hydrocarbon stream within the pipeline 205. For instance, the module 225 may detect the relative amount of chemical additives injected into the pipeline 205 by the one or more chemical injection systems 210. Such data may be wirelessly transmitted directly to each chemical injection system 210 and/or the remote control center 220. In some embodiments, the data is communicated to the remote control center 220, where it is then processed. The remote control center 220 may then wirelessly issue commands to one or more of the chemical injection systems 210. Such commands may include a command to stop injecting chemical additive into the pipeline 205 and/or a command to inject a specified amount of chemical additive into the pipeline 205. Thus, in some embodiments, some or all of the processing of data and command generation may occur at the remote control center 220 rather than each individual chemical injection system 210. In certain embodiments, the remote control center 220 may control one or more chemical injection systems 210 without regard to data received from the monitoring module 225. For instance, the remote control center 220 may issue commands to the chemical injection systems 210 to inject the chemical additives into the pipeline 205 at set intervals. Alternatively, the remote control center 220 may merely monitor and/or store data wirelessly communicated directly to the chemical injection systems 210 from the monitoring module 225. Upon receipt of such data, the chemical injection systems 210 may process the data and inject more or less chemical additive into the pipeline 205, as appropriate (as described above with reference to FIG. 1).

Further, in some embodiments, the remote control center 220 and/or the chemical injection systems 210 may account for the length of pipeline 205 between a particular chemical injection system 210 and the monitoring module 225. For instance, particular chemical injection systems 210 that are further away from the monitoring module 225 may inject more chemical additive into the pipeline 205 as compared to chemical injection systems 210 that are closer to the monitoring module 225. This may, in some embodiments, help ensure that the amount of chemical additive in the pipeline 205 is uniformly consistent.

Figure 3:
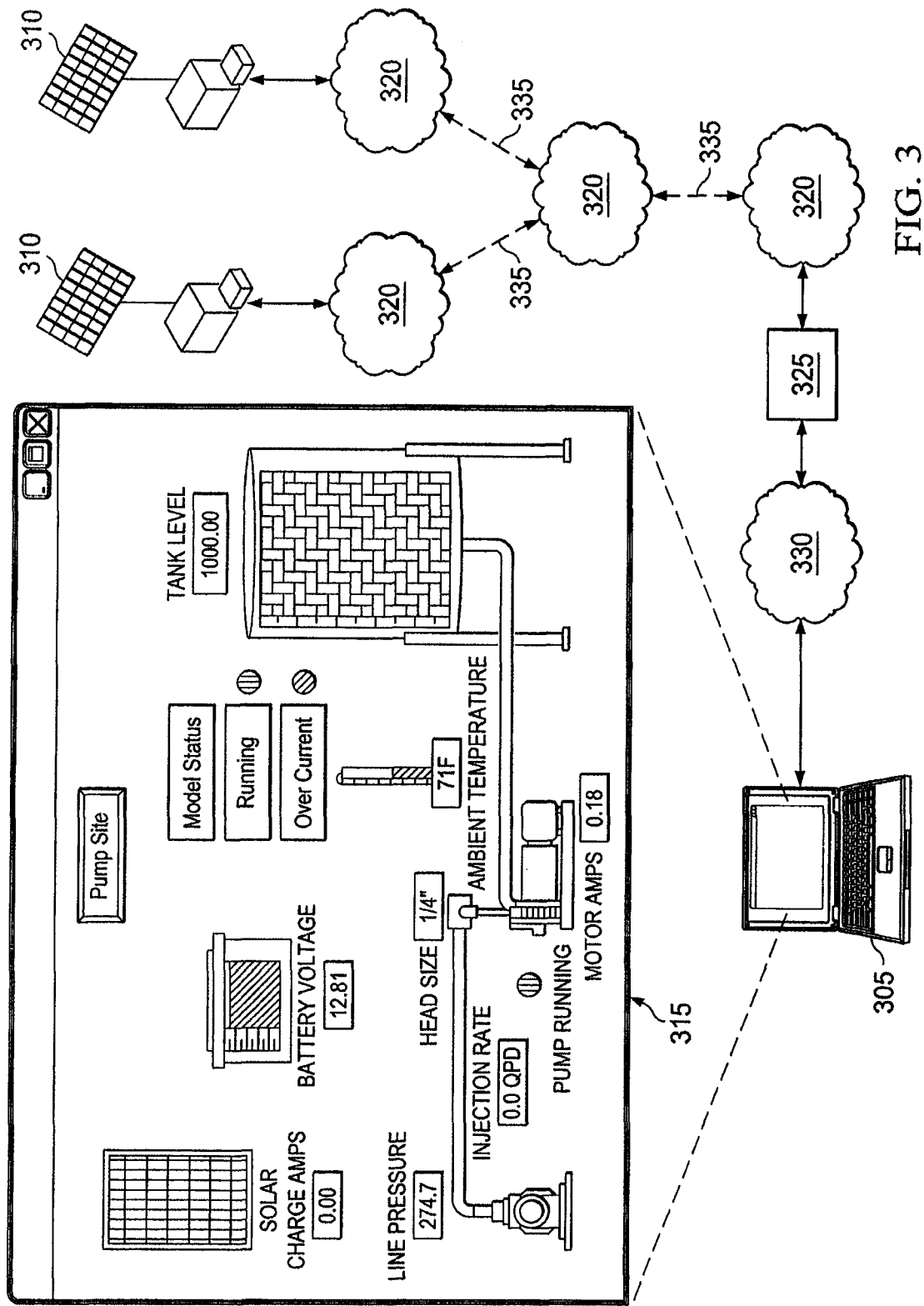
FIG. 3 illustrates a schematic drawing of an example system for managing one or more chemical injection systems in accordance with the present disclosure.
Figure 4A:
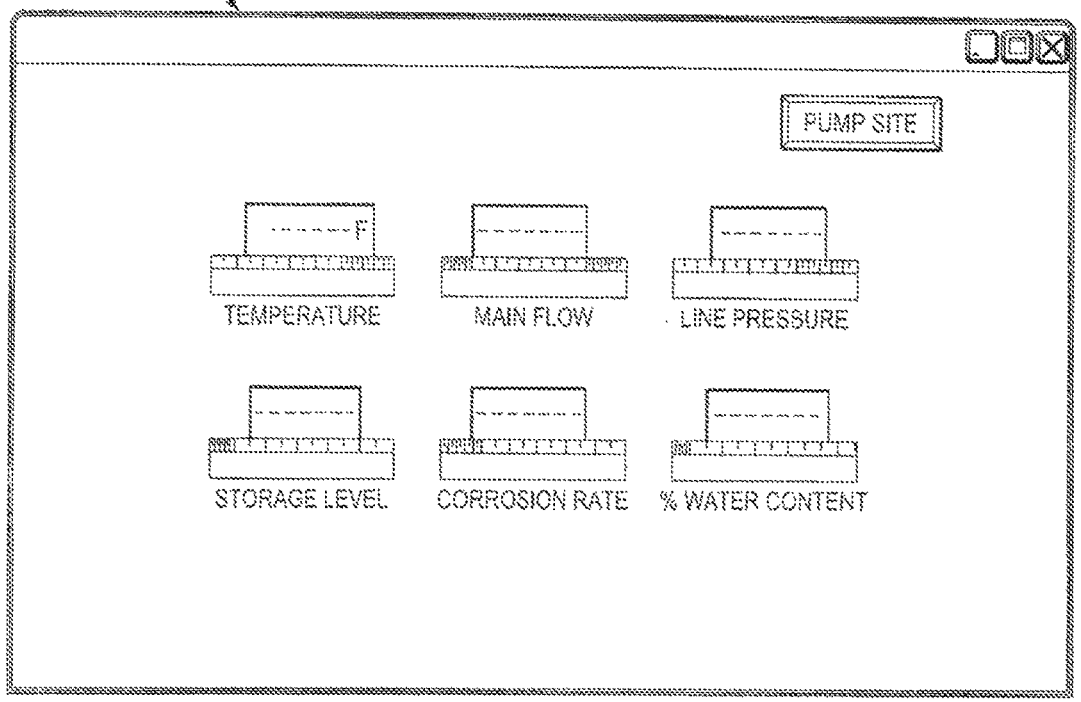
FIGS. 4A-D illustrate example graphical user interfaces (GUI) for use in a system for managing one or more chemical injection systems in accordance with the present disclosure.
Figure 4B:
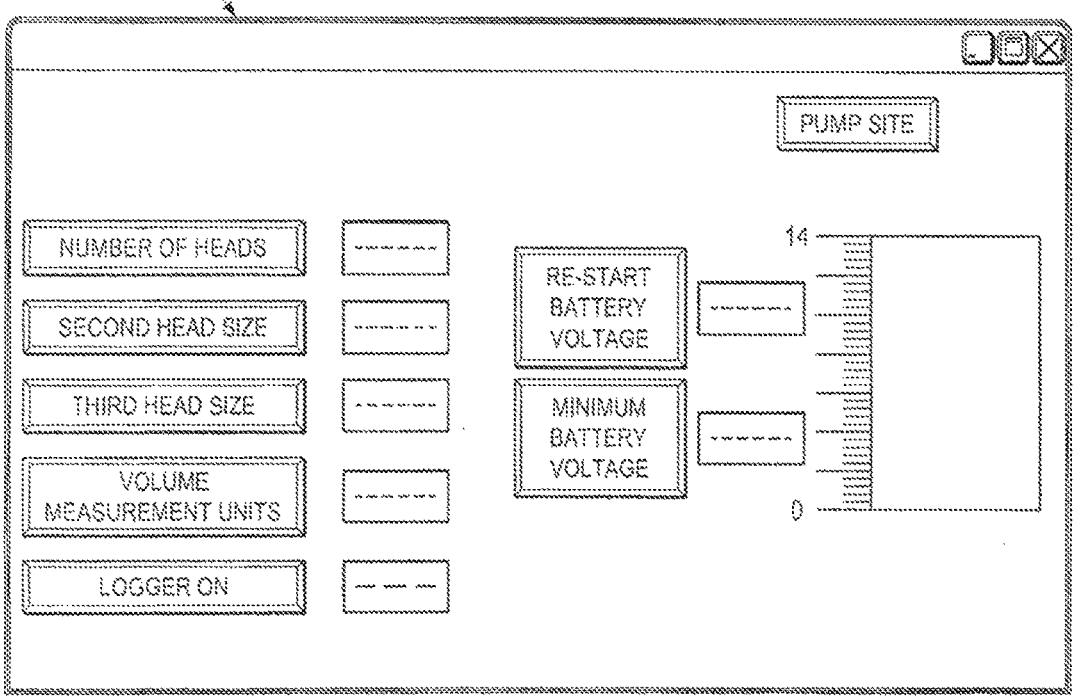
Figure 4C:
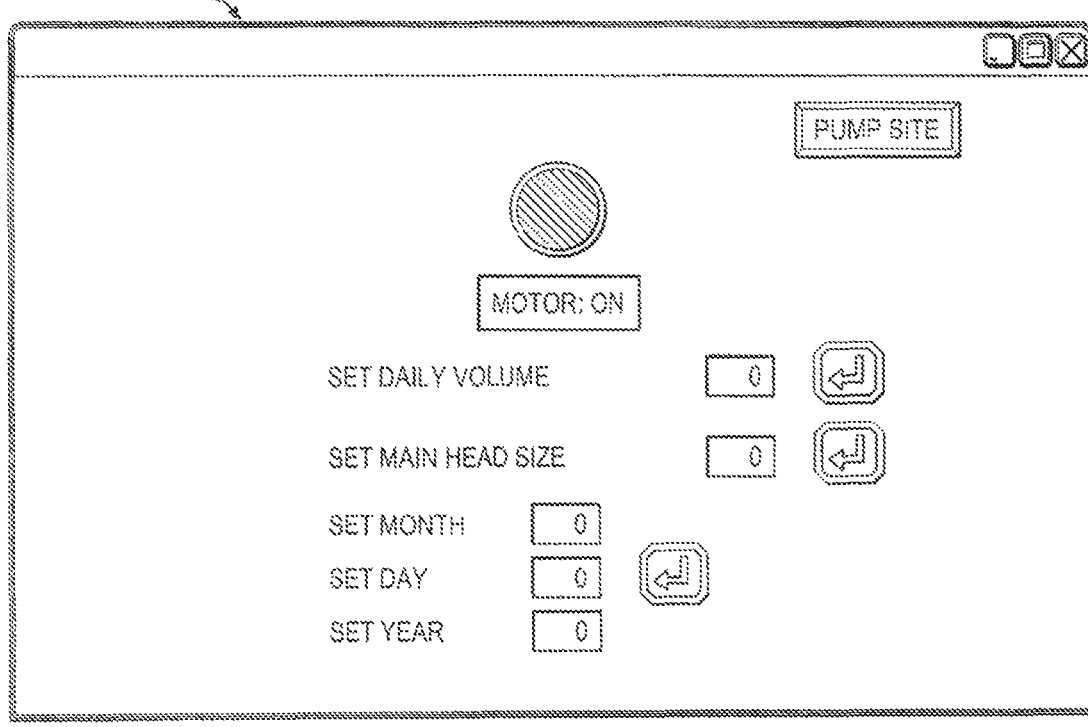
Figure 4D:
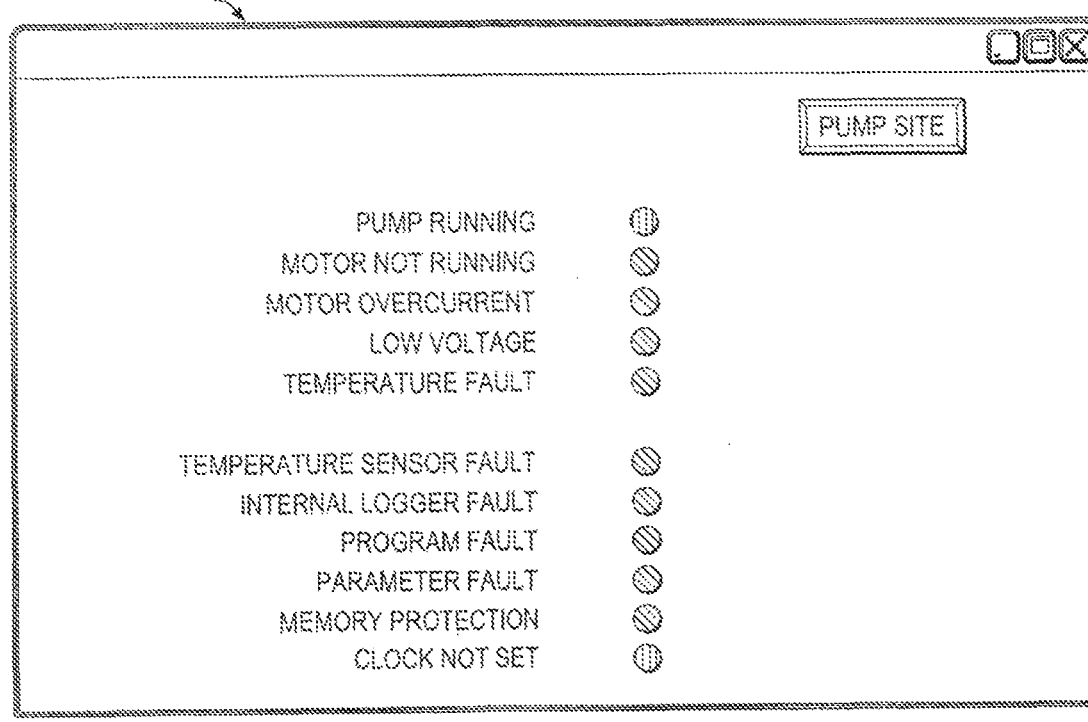

FIG. 3 illustrates a schematic drawing of an example system 300 for managing one or more chemical injection systems 310. In the illustrated embodiment, the system 300 includes a computer 305 displaying a graphical user interface (GUI) 315, one or more remote chemical injection systems 310, and a base transceiver 325. Generally, system 300 may be used to detect one or more operational parameters of a hydrocarbon stream within a pipeline (such as pipeline 205) and inject chemicals (e.g., corrosion inhibitors, ethanol, foamer) into the pipeline in response to or independent of the detected operational parameters. In addition, the system 300 may all for microprocessor-based remote monitoring and control of the one or more chemical injection systems 310 regardless of a communication protocol utilized by the chemical injection systems 310, the base transceiver 325, and/or the computer 305 (as well as other equipment present in system 300 but not illustrated in FIG. 3).

Computer 305 may be a standalone computing device, such as a laptop computer, personal digital assistant (PDA), handheld electronic mail device, desktop computer, server, or other computing device. Although illustrated as a laptop computer, reference to the computer 305 includes any processor-based computing device that is operable to manipulate, display, receive, and/or transmit data, such as data associated with a wellsite, hydrocarbon piping system, or other hydrocarbon production facility. For example, computer 305 may include a combination of software, middleware, and hardware, including one or more memory devices (e.g., volatile or non-volatile memory including, without limitation, magnetic media, optical media, random access memory (RAM), read-only memory (ROM), removable media, or any other suitable local or remote memory component). Computer 305 may store in memory and execute one or more software applications written or described in any appropriate computer language including C, C++, Java, Visual Basic, assembler, Perl, any suitable version of 4GL, as well as others, in order to manipulate, display, receive, and/or transmit data.

In some embodiments, the computer 305 may be located at a remote monitoring station, such as the station 220. Further computer 305 may be one of several computers at the remote monitoring station, where each computer 305 may monitor, receive data from, and/or generate commands transmitted to a single chemical injection system 310 or multiple chemical injection systems 310.

Each chemical injection system 310 may be positioned at or near a wellsite and/or a pipeline transporting hydrocarbon fluid. In some embodiments, the chemical injection system 310 may be substantially similar to chemical injection system 210 and/or chemical injection system 100 described above. For example, each chemical injection system 310 may include a pump mechanically coupled to a motor, a motor controller, a processor-based controller, and a chemical reservoir. Chemical injection system 310 may be used in such embodiments to inject or otherwise introduce chemicals (e.g., corrosion inhibitors, ethanol, foamer) into a hydrocarbon conduit. The pump is fluidly coupled to hydrocarbon conduit and the reservoir and draws a specified amount of chemical stored in the reservoir and injects the chemical into the conduit at predefined time intervals, predetermined operating conditions, and/or when commanded. The pump is coupled to a motor, which is electrically coupled to the motor controller. The motor controller receives electrical power (such as, for example, from a solar power module at the chemical injection system 310, as illustrated) and provides the power to the motor. In some embodiments, the motor controller may be a combination starter/disconnect, which provides "on-off" control of electrical power to the pump motor, while in such embodiments, the motor controller may be a variable frequency controller, operable to provide electrical power to the pump motor at a variety of frequencies (and thus rotational motor speeds) as system operating conditions warrant. In some embodiments, the controller may communicate to the motor controller in only one, or just a few, communication protocols (e.g., Modbus).

The controller is communicably coupled to the motor controller and, typically, provides microprocessor-based control of the motor controller and thus motor and pump of chemical injection system 310. In some embodiments, the controller is communicably coupled (e.g., wirelessly, via wired communication, or a combination thereof) to one or more communication stations 320. For example, in some embodiments, data may be transmitted between the communication station 320 and the chemical injection system 310 via a particular communication protocol (e.g., RS-232, RS-485 (Modbus or EIA-485), RS-422 (or EIA-422), TCP/IP, Fieldbus, DeviceNet, and Profibus, to name but a few) and over a certain communication form (e.g., cellular, RF, satellite, or other type of communication form). One or more additional communication stations 320 may be interposed between the communication station in direct communication with the chemical injection system 310 and a base transceiver 325. For example, the communication stations 320 may be radio frequency (RF) transceivers that are operable to send and receive RF signals 335 representative of data and/or commands between the chemical injection systems 310 and the base transceiver 325.

The base transceiver 325 receives and/or consolidates data received from the chemical injection systems 310 via the communication stations 320. The base transceiver 325 may also receive and/or consolidate commands to the chemical injection systems 310 from the computer 305 (or other computing device). In the illustrated embodiment, the base transceiver 325 may communicate with the computer 305 over a communications network 330. For example, the communications network 330 may be all or a portion of an enterprise or secured network; a VPN merely between computer 305 and other computing devices communicably coupled to the base transceiver 325; one or more local area networks (LANs), radio access networks (RANs), metropolitan area networks (MANs), wide area networks (WANs), all or a portion of the global computer network known as the Internet; and/or any other communication system or systems at one or more locations.

The GUI 315, in the illustrated embodiment, displays one or more variables or data for monitoring, managing, or otherwise controlling the chemical injection systems 310.

For example, in the illustrated embodiment, the GUI 315 may display a level of a chemical reservoir at the chemical injection system 310; power capacity and/or availability of a pump motor at the chemical injection system 310; one or more pump or pump motor characteristics (e.g., amps, current status, pressure, as well as other parameters). The GUI 315 may also display other information in the illustrated format or in different formats.

In operation, a user or operator may utilize the GUI 315 to control one or more components of the chemical injection system 310 based on data received from the system 310 and displayed on the GUI 315. For example, each chemical injection system 310 may include a number of wireless sensor devices operable to detect one or more operational parameters of the hydrocarbon stream within the pipeline. For instance, the system 310 may detect the relative amount of chemical additives injected into the pipeline. In some embodiments, the data is communicated to the computer 305 via the communication stations 320, base transceiver 325, and communications network 330, where it is then processed. The computer 305 and/or a user operating the computer 305 may then issue commands to one or more of the chemical injection systems 310. Such commands may include a command to stop injecting chemical additive into the pipeline and/or a command to inject a specified amount of chemical additive into the pipeline.

Turning to FIGS. 4A-D, other example GUIs 400, 410, 420, and 430 are illustrated. One or more of GUIs 400, 410, 420, and 430 may be displayed on the computer 305 in place of or in addition to GUI 315. Further, GUIs 400, 410, 420, and 430 may show additional information associated with the chemical injection system 310. For example, GUI 400 provides information related to temperature of fluid flowing through the pipeline and/or from chemical reservoir; flow rate of fluid flowing through the pipeline and/or from chemical reservoir; fluidic pressure of fluid flowing through the pipeline and/or from chemical reservoir; fluidic storage level of the chemical reservoir; a corrosion rate of the pipeline or other hydrocarbon transmission system; and a percentage water content of fluid flowing through the pipeline. GUI 410 provides information related to battery characteristics of the chemical injection system 310, as well as characteristics of the pipeline and/or other hydrocarbon transmission system. GUI 420 provides information related to motor characteristics of a motor in the chemical injection system 310. GUI 430 provides information related to additional operational characteristics of a pump and % or motor in the chemical injection system 310, as well as example fault information of the chemical injection system 310.

Returning to FIG. 3, in certain embodiments, the computer 305 may control one or more chemical injection systems 310 without regard to data received from the systems 310 (or other monitoring systems). For instance, the computer 305 may issue commands to the chemical injection systems 310 to inject the chemical additives into the pipeline at set intervals. Alternatively, the computer 305 may merely monitor and/or store data wirelessly communicated directly to the chemical injection systems 310. Upon receipt of such data, the chemical injection systems 310 may process the data and inject more or less chemical additive into the pipeline.

A number of embodiments have been described, and several others have been mentioned or suggested. Other embodiments are within the scope of the disclosure and claims. Some of the advantages of the chemical injection systems described herein have been discussed throughout this disclosure. Furthermore, those skilled in the art will readily recognize additional advantages that a variety of additions, deletions, alterations, and substitutions may be made to these embodiments.

What is claimed is:

1. A method, comprising:
   monitoring a hydrocarbon stream in a hydrocarbon pipeline with a monitoring module in fluid communication with the hydrocarbon pipeline, the monitoring module comprising one or more sensor devices operable to detect one or more operational parameters of the hydrocarbon stream; and
   injecting an amount of one or more chemical fluids adapted to treat the hydrocarbon stream via a pair of chemical injection systems remote and spaced apart from the monitoring module and in fluid communication with the hydrocarbon pipeline;
   wherein the amount of the one or more chemical fluids accounts for a relative distance as measured between the monitoring module and each of the pair of chemical injection systems by data transmission between the pair of chemical injection systems and a control station that is remote from the pair of chemical injection systems, the data defining the one or more operational parameters from the monitoring module and commands to operate a pump motor at each one of the pair of chemical injection systems,
   wherein data transmission from the monitoring module to the control station occurs as follows,
      receiving, at a first communication station, data defining the one or more operational parameters from the pair of chemical injection systems in a first communication protocol;
      using the first communication station, transmitting the data in the first communication protocol to a second communication station;
      receiving the data in the first communication protocol at a base transceiver via the second communication station;
      using a communication network to connect the base transceiver to a computer at the control station; and
   wherein the computer, processes the data in the first communication protocol to generate data defining the commands in a second communication protocol that causes the pump motor to provide a uniformly consistent quantity of the one or more chemical fluids in the hydrocarbon pipeline,
   wherein the first communication protocol is distinct from the second communication protocol.

2. The method of claim 1, further comprising modulating power supplied to the pump motors in response to the commands so as to operate the pumps to disperse the amount of the one or more chemical fluids.

3. The method of claim 1, wherein the one or more operational parameters comprise at least one of the following:
   a fluidic pressure in the hydrocarbon transmission system;
   a fluidic flow rate in the hydrocarbon transmission system;
   a percentage concentration by weight or volume of the chemical fluid in the hydrocarbon transmission system;
   an operational parameter of the motor;
   a controller temperature;
   a battery voltage;
   a motor current;
   a solar cell charge current; and
   one or more fault conditions.

4. The method of claim 1, further comprising:
wirelessly transmitting a signal representative of the one or more operational parameters from the one or more sensor devices to the pair of chemical injection systems.

5. The method of claim 1, wherein the one or more chemical fluids comprise at least one of:
a corrosion inhibitor;
a paraffin inhibitor;
a demulsifier;
an ethanol; and
a foamer.

6. The method of claim 1, wherein the hydrocarbon pipeline is configured to connect in fluid communication with one or more hydrocarbon production sites.

7. The method of claim 1, further comprising:
injecting more of the one or more chemical fluids with a first chemical injection system of the pair of chemical injection systems rather than with a second chemical injection system of the pair of chemical injection systems in response to a first distance between the first chemical injection system and the monitoring module that is larger than a second distance between the second chemical injection system and the monitoring module.

8. The method of claim 1, wherein data transmission from the computer to the pump motors occurs as follows,
receiving the data in the second communication protocol at the second communication station via the base transceiver;
using the second communication station, transmitting the data in the second communication protocol to the first communication station; and
transmitting, from the first communication station, data defining the commands from the computer to the pump motor at each of the chemical injection stations.

* * * * *